United States Patent [19]
Cilke et al.

[11] Patent Number: 6,122,038
[45] Date of Patent: Sep. 19, 2000

[54] METHOD AND APPARATUS FOR A LARGE-FORMAT SCANNER

[75] Inventors: J. Thomas Cilke; James T. Sherhart; Curtis A. Lipkie; Robert H. Ring, all of Littleton, Colo.

[73] Assignee: Colortrac, Inc., Littleton, Colo.

[21] Appl. No.: 09/160,388

[22] Filed: Sep. 25, 1998

[51] Int. Cl.[7] ............................ G03B 27/50; G03B 27/52; H04N 1/04
[52] U.S. Cl. ............................... 355/84; 355/40; 358/482
[58] Field of Search ....................... 355/84, 40; 399/151; 358/474, 485, 496, 482, 494, 471; 250/208.3, 208.1

[56] References Cited

U.S. PATENT DOCUMENTS

| | | | |
|---|---|---|---|
| 4,967,233 | 10/1990 | Buchar et al. | 358/496 |
| 5,142,137 | 8/1992 | Kushino et al. | 250/208.1 |
| 5,475,505 | 12/1995 | Minasian et al. | 355/25 |
| 5,801,849 | 9/1998 | Soloveychik et al. | 358/474 |
| 5,912,746 | 6/1999 | Cilke et al. | 358/482 |

*Primary Examiner*—Safet Metjahic
*Assistant Examiner*—Hung Henry Nguyen
*Attorney, Agent, or Firm*—Bromberg & Sunstein LLP

[57] ABSTRACT

An apparatus and method for a large-format scanner. In a preferred embodiment, a device for scanning an image on a medium having a width and providing signals representing the image includes a frame, a transport, a lamp and a plurality of sensors. The transport is mounted to the frame and is used for moving the medium along a first axis transverse to the medium's width. The lamp illuminates the medium. The lamp has a first end and a second end wherein the first end and the second end are folded back approximately 180 degrees, so that the lamp produces uniform brightness across the width of the medium. The plurality of sensors are proximate to the transport, span the medium's width, and the sensors provide a signal representative of a portion of the image within the illuminated portion of the medium. The device may also include a focal length adjustor, mounted to the frame between the sensors and the transport, for adjusting the distance between the medium and the sensors. In another embodiment, a method for focusing a device for scanning an image on a medium having a plurality of sensors each sensor having a length is presented. A scan pattern is placed into the device for scanning which creates an output of the scan pattern. The scan pattern has black dots and white spaces, where the black dots are approximately the length of a sensor, and the white spaces are positioned between the black dots. The white dots are of such a size that the black dots are spaced apart at a distance which is greater than the length of a sensor. The output of the scan pattern is displayed and the focal length between the sensor and the medium is changed based on the output of the scan pattern so that at least one sensor produces a signal which is displayed as a peak black reading.

9 Claims, 12 Drawing Sheets

SIDE VIEW OF SCANNER

SIDE VIEW OF SCANHEAD

ISOMETRIC VIEW OF THE IMAGING ASSEMBLY

OPTO ASSEMBLY LESS SCANHEAD

OPTO ASSEMBLY FIXTURE

FIXTURE WITH OPTO FRAME AND SIDE PLATES

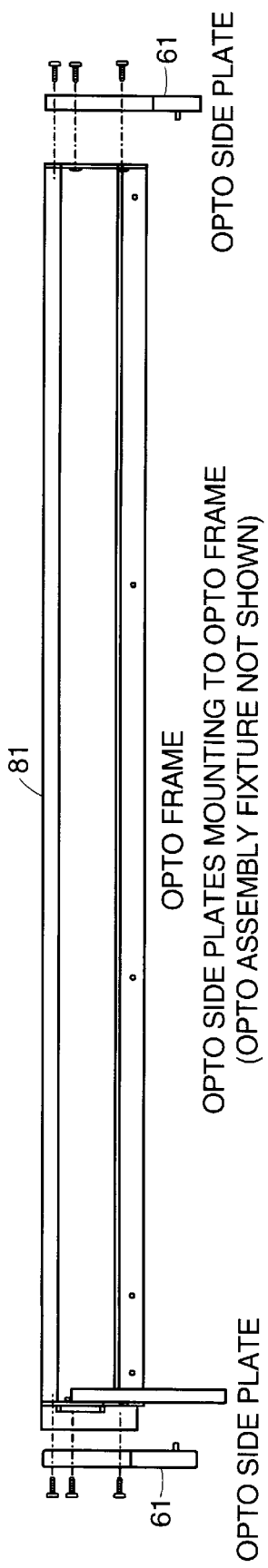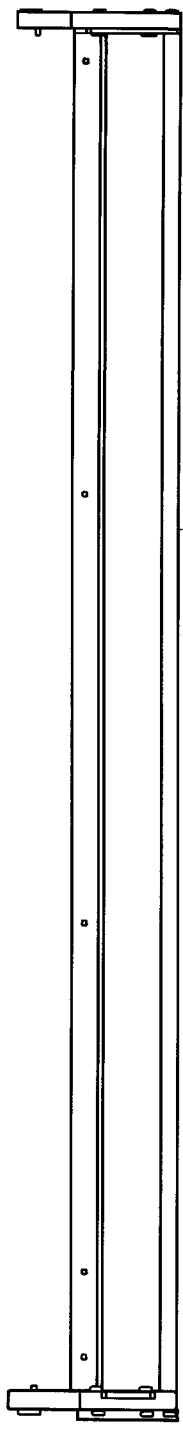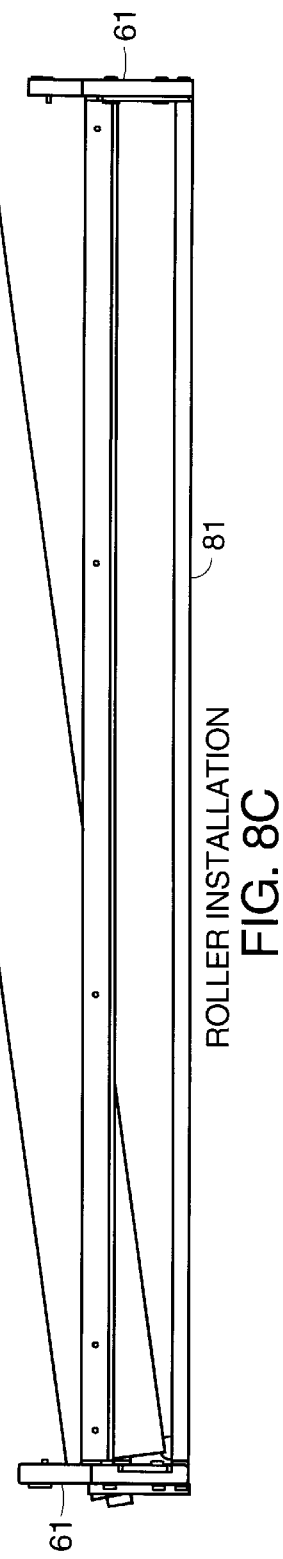

METHOD AND APPARATUS FOR A LARGE-FORMAT SCANNER

TECHNICAL FIELD

This invention generally relates to devices for scanning images on a medium, and specifically to devices capable of scanning large-format media (i.e., greater than thirty inches wide) with high-resolution. The invention also relates to methods for manufacturing such devices and to methods for processing the scanned information.

BACKGROUND OF THE INVENTION

Some prior-art scanners are assembled using precision-made parts. The parts must be tooled to precise tolerances so that the distance between the medium being scanned and the multiple sensors used for scanning are kept a fixed distance apart. However, because of inconsistencies in the characteristics of lenses which are placed between the medium and the sensors in order to focus the medium's image onto the sensors, some parts of the image may be in focus while other areas are out of focus, even though the sensors, lenses, and medium are all perfectly parallel to each other.

Normally scanners are provided with a test image containing a line pattern and software which optimizes the scanning process through digital manipulation of the image. The line pattern of the test image normally contains black continuous lines that extend the length of the paper being scanned along with spaces between the lines. Both the thickness of the black lines and the thickness of the white spaces between the lines are about the same as or a little smaller than the width of the scanner's pixels. If the line pattern is slightly misaligned so that each sensor reads half a line and half a space, each sensor will read an intermediate gray, and the scanner's focus cannot be tested properly.

SUMMARY OF THE INVENTION

The invention provides, in a preferred embodiment, a device for scanning an image on a medium having a width and providing signals representing the image. The device includes a frame, a transport, a lamp and a plurality of sensors. The transport is mounted to the frame and is used for moving the medium along a first axis transverse to the medium's width. The lamp illuminates the medium. The lamp has a first end and a second end wherein the first end and the second end are folded back approximately 180 degrees, so that the lamp produces uniform brightness across the width of the medium. The plurality of sensors are proximate to the transport, span the medium's width, and the sensors provide a signal representative of a portion of the image within the illuminated portion of the medium. The device may also include a focal length adjuster, mounted to the frame between the sensors and the transport, for adjusting the distance between the medium and the sensors. In another embodiment, the device may include a substrate mounted to the frame so that the medium passes between the substrate and the transport where the substrate has a length spanning the width of the medium and the substrate is connected to the plurality of sensors.

In an embodiment in accordance with a method of manufacturing a device for scanning an image on a medium, the method is used with a device having sensors, lenses, a lamp and a transport. The method ensures that the sensors, the lenses and the medium being scanned are all in proper alignment for focusing. The sensors and lenses are mounted to a rigid bar having a length, wherein the sensors and lenses are mounted parallel on the rigid bar. The rigid bar is inserted in an enclosure having a first end and a second end. The enclosure is mounted adjacent the transport and the lamp. A test pattern is scanned which has a scan pattern and the output of the scan pattern is displayed. The position of the rigid bar is adjusted within the enclosure so as to alter the distance between the rigid bar and the transport to focus the output. Further, the rigid bar may be attached to the first end and to the second end. In another embodiment, the enclosure has adjustable attachment points spaced along the length of the rigid bar. In the step of adjusting, each adjustable attachment point may be repositioned to adjust the distance between the rigid bar and the transport at a position along the length of the rigid bar.

In yet another embodiment, a method for focusing a device for scanning an image on a medium having a plurality of sensors each sensor having a length is presented. A scan pattern is placed into the device for scanning which creates an output of the scan pattern. The scan pattern has black dots and white spaces, where the black dots are approximately the length of a sensor, and the white spaces are positioned between the black dots. The white dots are of such a size that the black dots are spaced apart at a distance which is greater than the length of a sensor. The output of the scan pattern is displayed and the focal length between the sensor and the medium is changed based on the output of the scan pattern so that at least one sensor produces a signal which is displayed as a peak black reading.

In yet another embodiment, a scanhead, a roller and a lamp which are part of a device for scanning an image on a medium are assembled. Two end pieces are provided which include connectors for receiving the ends of the scanhead and the roller, and holding the scanhead and the roller in parallel. An assembly fixture is attached to the two end pieces and a rigid box is provided between the two end pieces. The rigid box is then connected to the two end pieces and the assembly fixture is removed. The scanhead roller and lamp are then mounted to the two end pieces. Other objects and advantages of the present invention will become apparent during the following description of the presently preferred embodiments of the present invention taken in conjunction with the drawings.

BRIEF DESCRIPTION OF THE DRAWINGS

FIGS. 8A, 8B, and 8C show the roller being placed within the optical assembly.

DESCRIPTION OF THE SPECIFIC EMBODIMENTS

Figure 1:
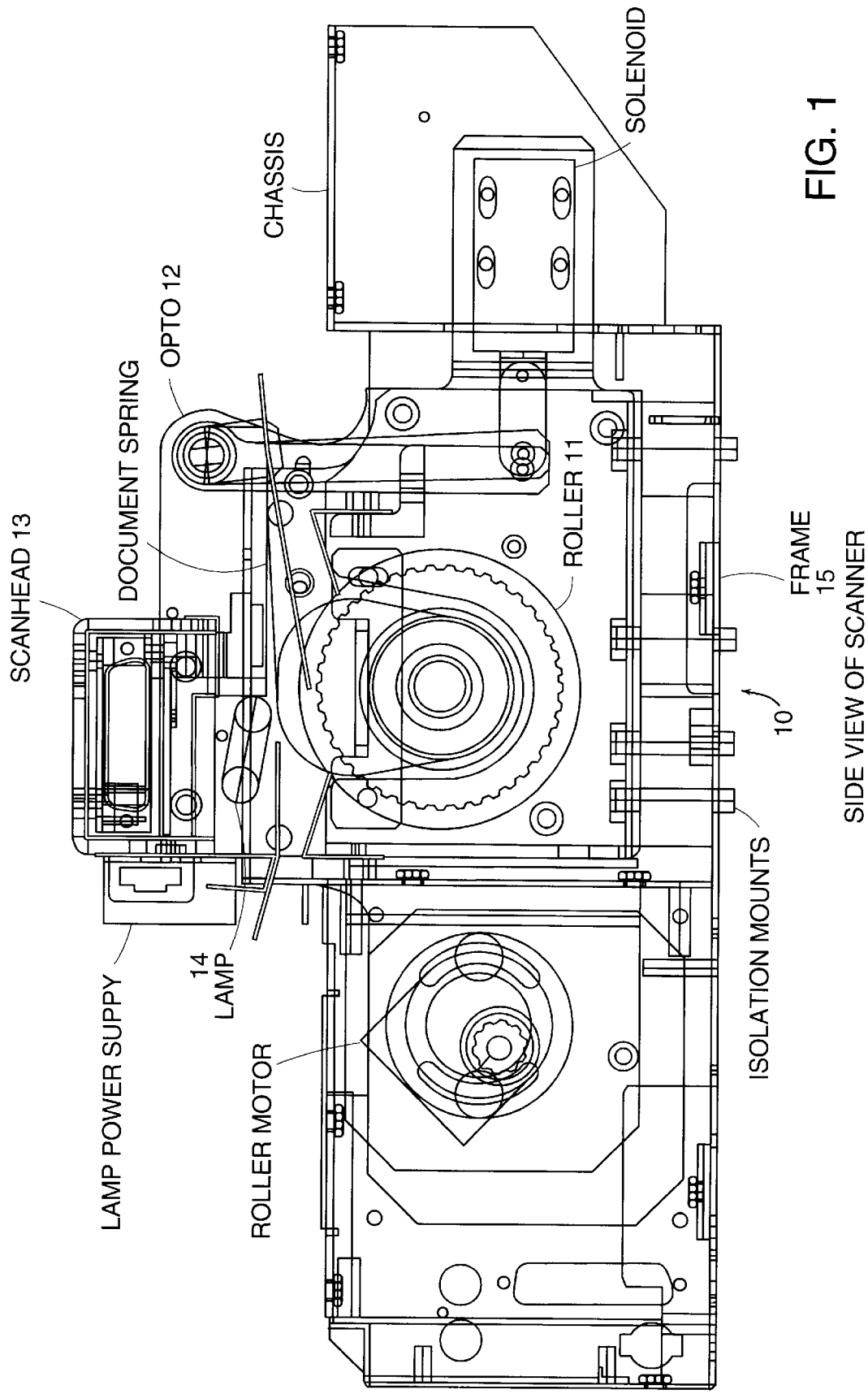
FIG. 1 shows a side view of the optical assembly of the scanner in accordance with a preferred embodiment of the invention.

FIG. 1 shows a side view of a device for scanning 10 an image on a medium in accordance with one embodiment of the invention. The device for scanning 10 has a scanhead 13 which contains optical-sensors for producing an analog signal of the medium, a lens array for directing the illuminated image to the optical sensors, and electronics for transforming the analog signal into digital information. The device for scanning also includes an optical assembly 12 which houses a roller on which the medium resides as it is being scanned. A transport 11, mounted to a frame 15, is provided for receiving the medium and moving the medium along a first axis transverse to the medium's width. The scanner further encompasses a lamp 14 for illuminating the medium.

Figure 2:
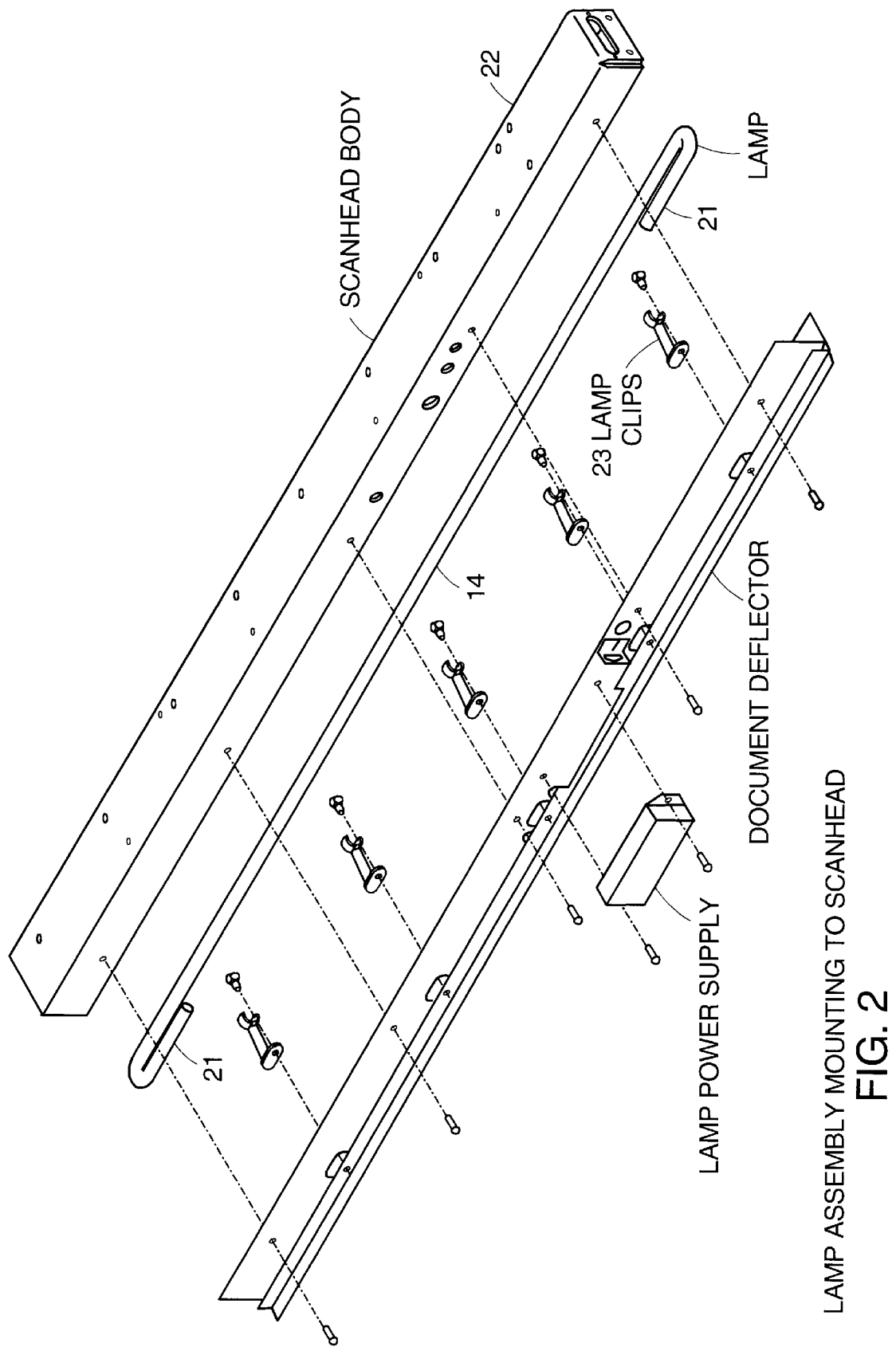
FIG. 2 shows an isometric exploded view of the lamp and the scanhead body from the rear.

In a scanner which possesses a straight cold cathode tube, the end sections produce less illumination, therefore to produce uniform illumination across the entire medium the lamp tube must normally be larger than the medium which is being scanned. In order to illuminate the medium uniformly as it is being scanned the ends 21 of the lamp tube 14 are bent back approximately 180 degrees as shown in FIG. 2. By bending the tube 14, the lamp may be sized so that it is the length of the large-format medium, and the portion of the tube 14 that produces substantially uniform illumination can shine directly on the medium, while the section of the tube that is bent back 21 is spaced further away from the portion of the medium being scanned. An additional benefit is that the scanner can be packaged in a frame 15 which is not substantially wider than the medium. The lamp 14 is mounted to the scanhead body. FIG. 2 shows the lamp being mounted to the side of an enclosure 22 which is the scanhead body with multiple lamp clips 23.

Figure 3:
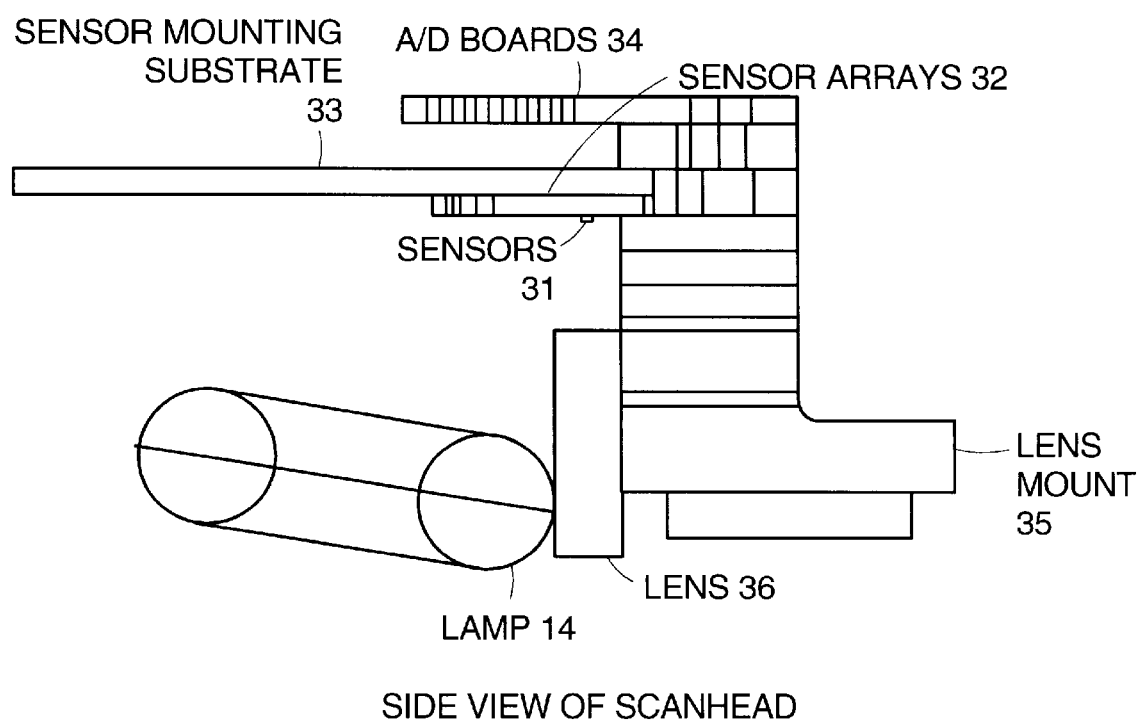
FIG. 3 shows a side view of the scanhead's interior components.

FIG. 3 shows a side view of the scanhead 13. A plurality of sensors 31 are positioned on a sensor array board 32. The sensor array board 32 is attached to a sensor substrate mounting 33 which holds multiple sensor arrays 32 and spans the width of the medium. This apparatus is further described in an application filed by the same assignee given Ser. No. 08/814,763, entitled Large-Format Scanner, filed on Mar. 10, 1997, which is incorporated by reference herein in its entirety. The signal produced by the sensors 31 is passed to an A/D board 34 for converting the analog signal of the sensors 31 into a digital signal. The sensors 31 provide a signal representative of a portion of the image within the illuminated portion of the medium.

Figure 4:
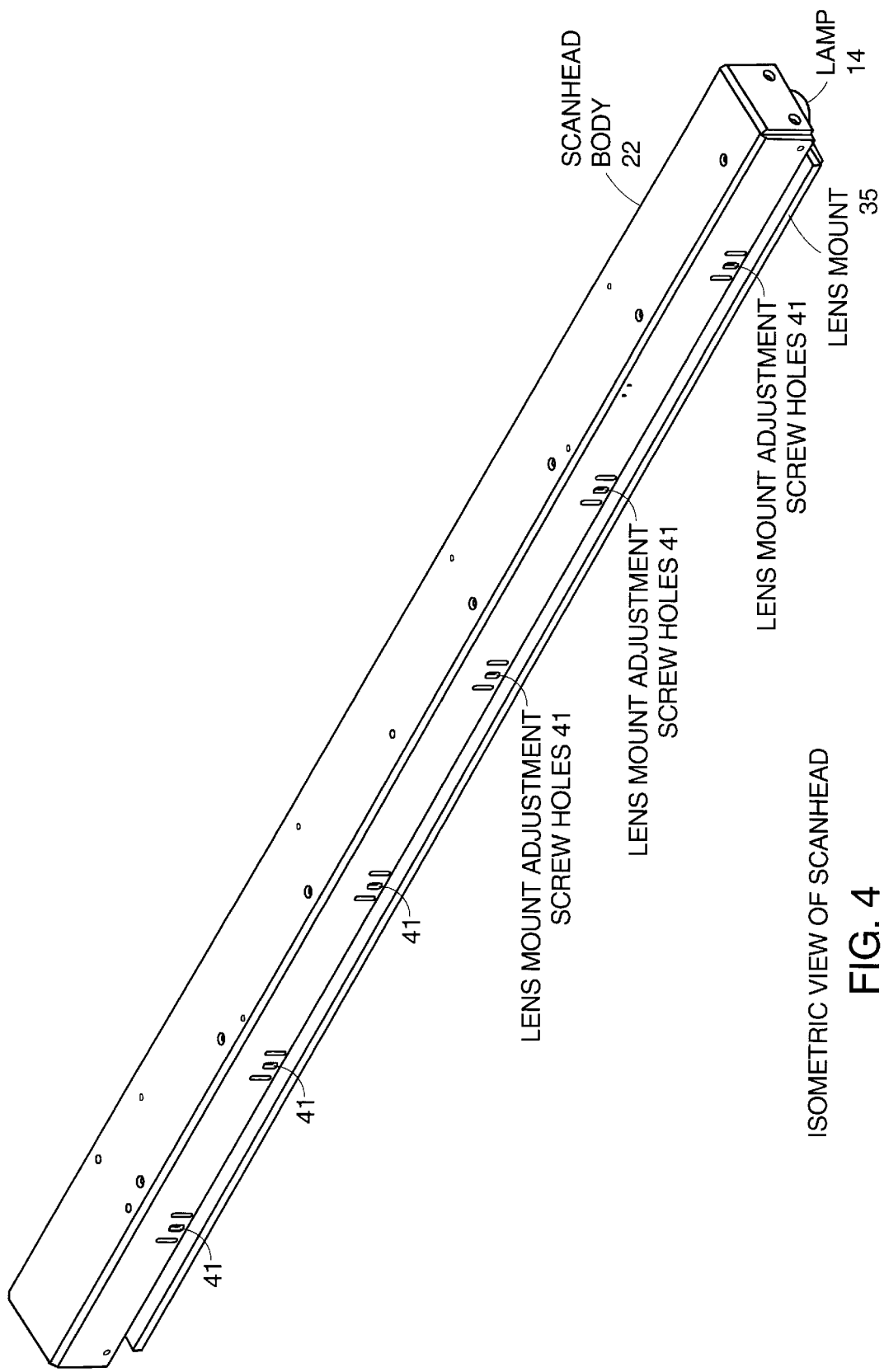
FIG. 4 shows an isometric view of the exterior of the assembled scanhead body from the front.
Figure 5:
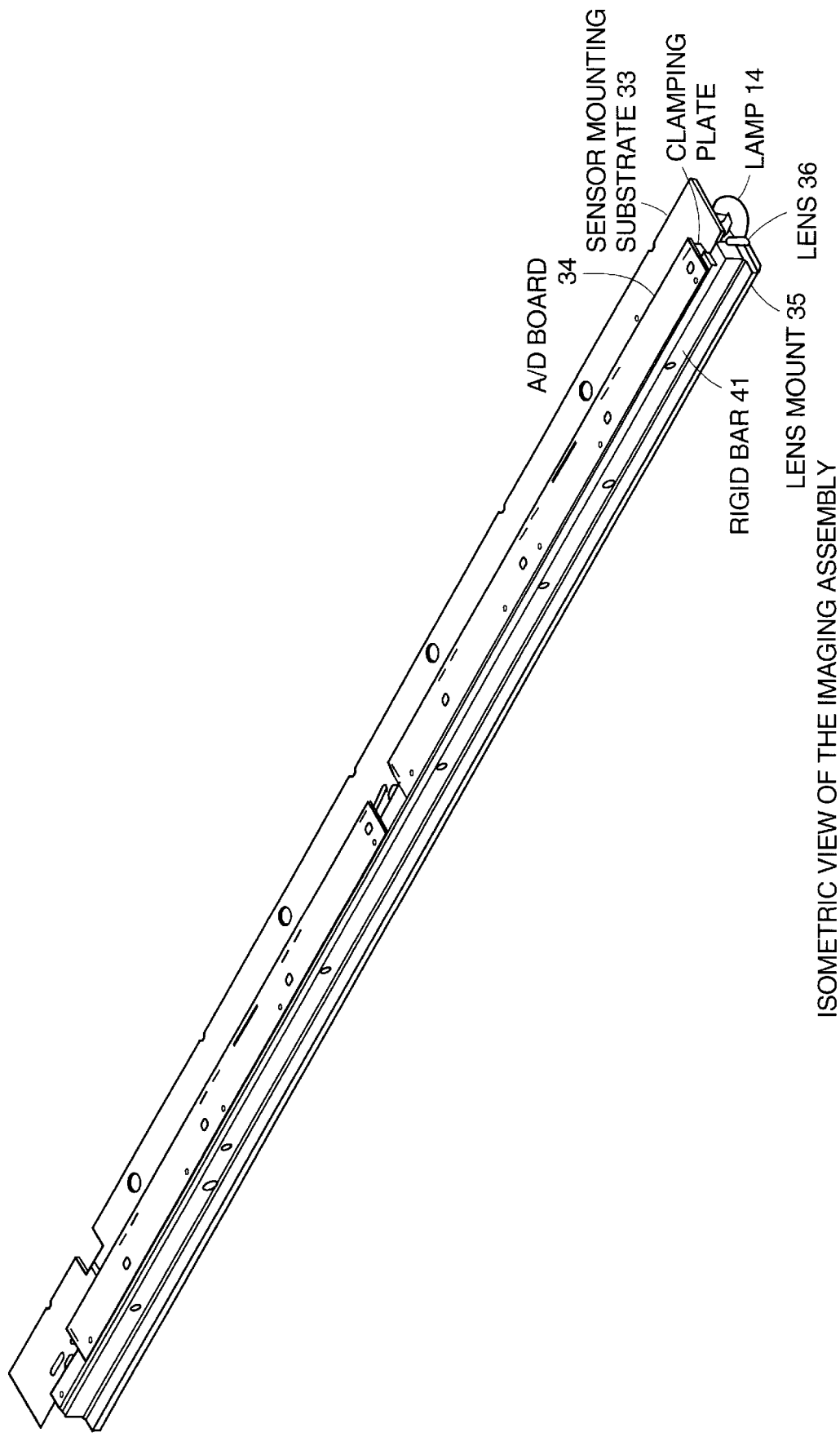
FIG. 5 shows an isometric view of the scanhead's interior components including the sensor/lens arrangement.
Figure 6:
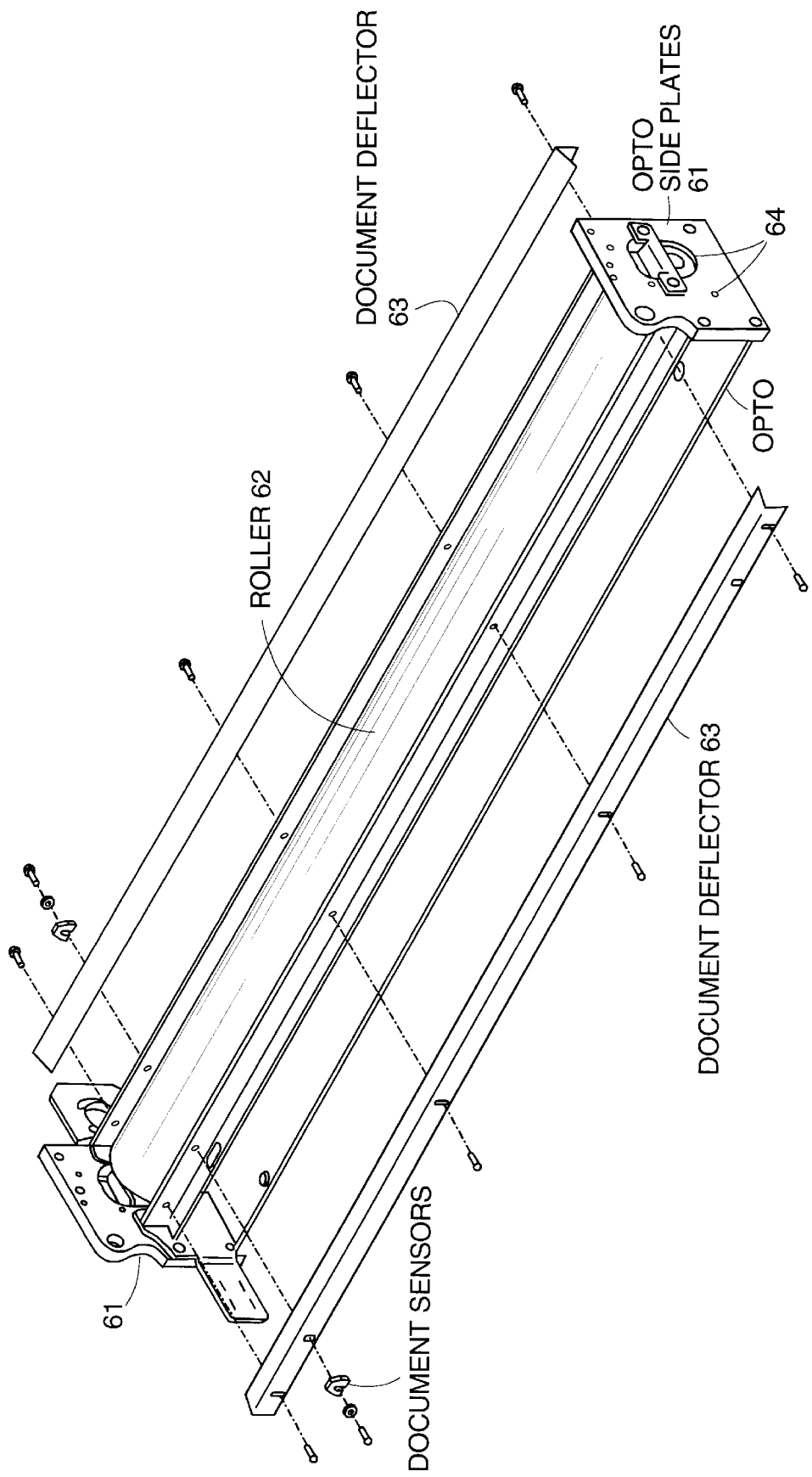
FIG. 6 shows an isometric view of the optical assembly.
Figure 7A:
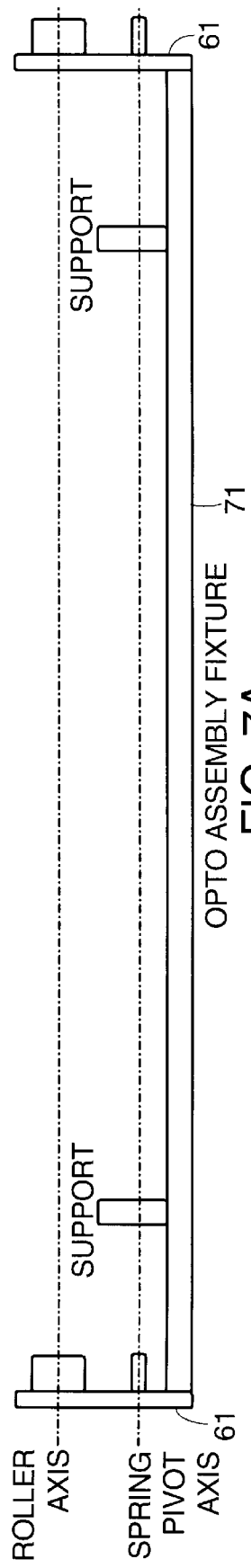
FIGS. 7A and 7B show a side and rear view of the optical assembly being assembled.
Figure 7B:
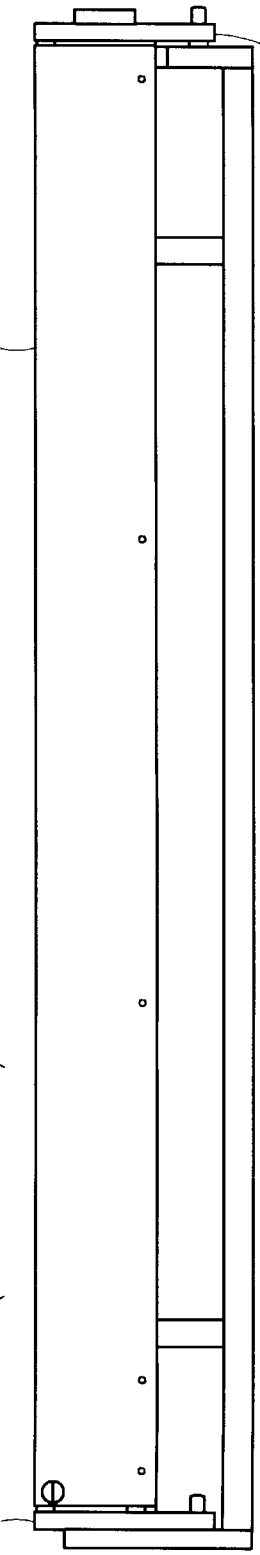

FIG. 4 shows an isometric view of the exterior of the scanhead 13 and FIG. 5 shows the internal components within the scanhead body 22. The scanhead 13 may be manufactured by mounting the sensors 31 and lens array 36 including a lens mount 35 to a precision-made rigid bar 51 forming a lens/sensor arrangement, so that the lens array 36 and the sensors 31 are kept parallel. The lens array 36 and sensors 31 are kept parallel to allow the light from the lamp 14 which, illuminates the medium to pass through the lens array 36 to the sensors 31. The lens array may be composed of selfoc lenses which are formed from light pipes. The light pipes are arranged in a long, somewhat flexible strip that spans the width of the document being scanned. The lens/sensor arrangement is inserted in an enclosure 22, such as a folded sheet metal box, which constitutes the scanhead body. The scanhead body 22 may be made out of other materials, such as, plastic and need not be a precision-made component. The precision-made bar 51 extends the length of the scanhead body 22 and is loosely attached to each end. The scanhead body 22 is provided with adjustment screw holes 41 for receiving screws therethrough to adjust the position of the precision-made rigid bar 51. As shown in FIG. 4 there are six adjustment screw holes 41 and therefore six adjustment screws (not shown). The lamp 14 is then attached to the scanhead body 22 and the scanhead 13 is mounted adjacent the transport 11 and the optical assembly 12. FIG. 6 shows an isometric view of the optical assembly 12. The optical assembly 12 may be assembled by first providing two end pieces 61 which are precision made and have apertures for receiving the ends of the scanhead and apertures and reference pins for the roller 62. The two end pieces 61 are attached to an assembly fixture which is used only during assembly. The assembly fixture 71 is precision made and aligns the two end pieces 61 so that the roller axis and the spring pivot axis are placed in parallel as shown in FIG. 7A and FIG. 7B. A second enclosure 81, such as a rigid folded metal box, which is approximately the length of the assembly fixture 71, is placed between the two end pieces 61 and attached such that no stress is placed along the length of the second enclosure 81 as shown in FIG. 8. The roller 62 is then positioned between the two end pieces 61 and through the apertures of the end pieces. The assembly fixture 71 is then removed and the document deflectors 63 are attached with springs to the spring pivot reference pins so that the document deflector 63 is properly positioned in relation to the roller 62.

Figure 9:
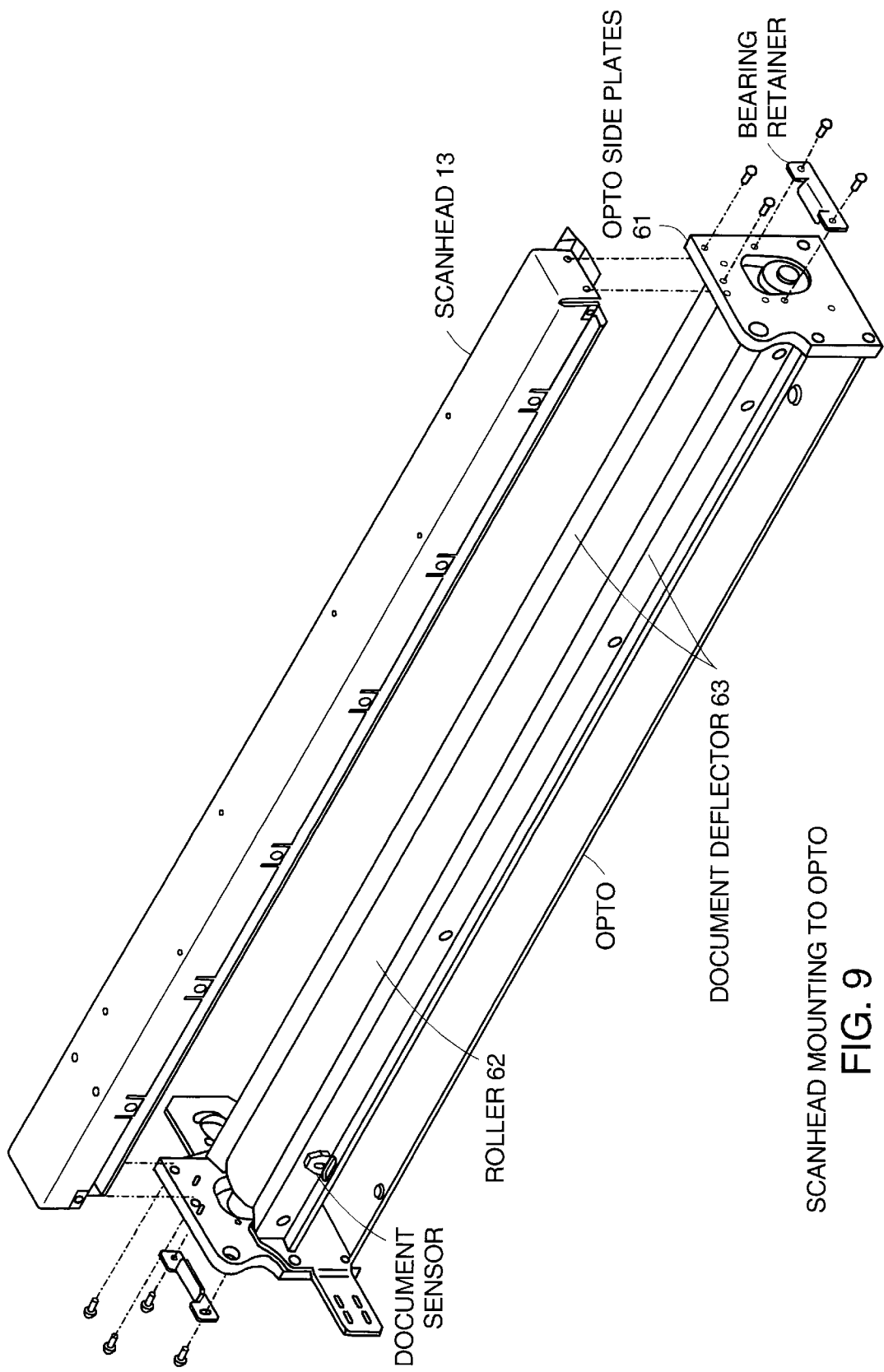
FIG. 9 shows an isometric view of the scanhead being mounted to the optical assembly.

The assembled scanhead 13 may then be placed atop the optical assembly 12 and the scanhead 13 may be secured to the two side plates 61 of the optical assembly 12 as shown in FIG. 9. By keeping the spring pivot axis and the roller axis parallel it is assured that the medium remains flush with the roller 62 because the document deflector 63 holds the medium to the roller 62 when it is scanned. Assembly in such a fashion provides that the distance between the medium which resides on the roller 62 when it is scanned and the lens/sensor assembly remains fixed.

Figure 10:
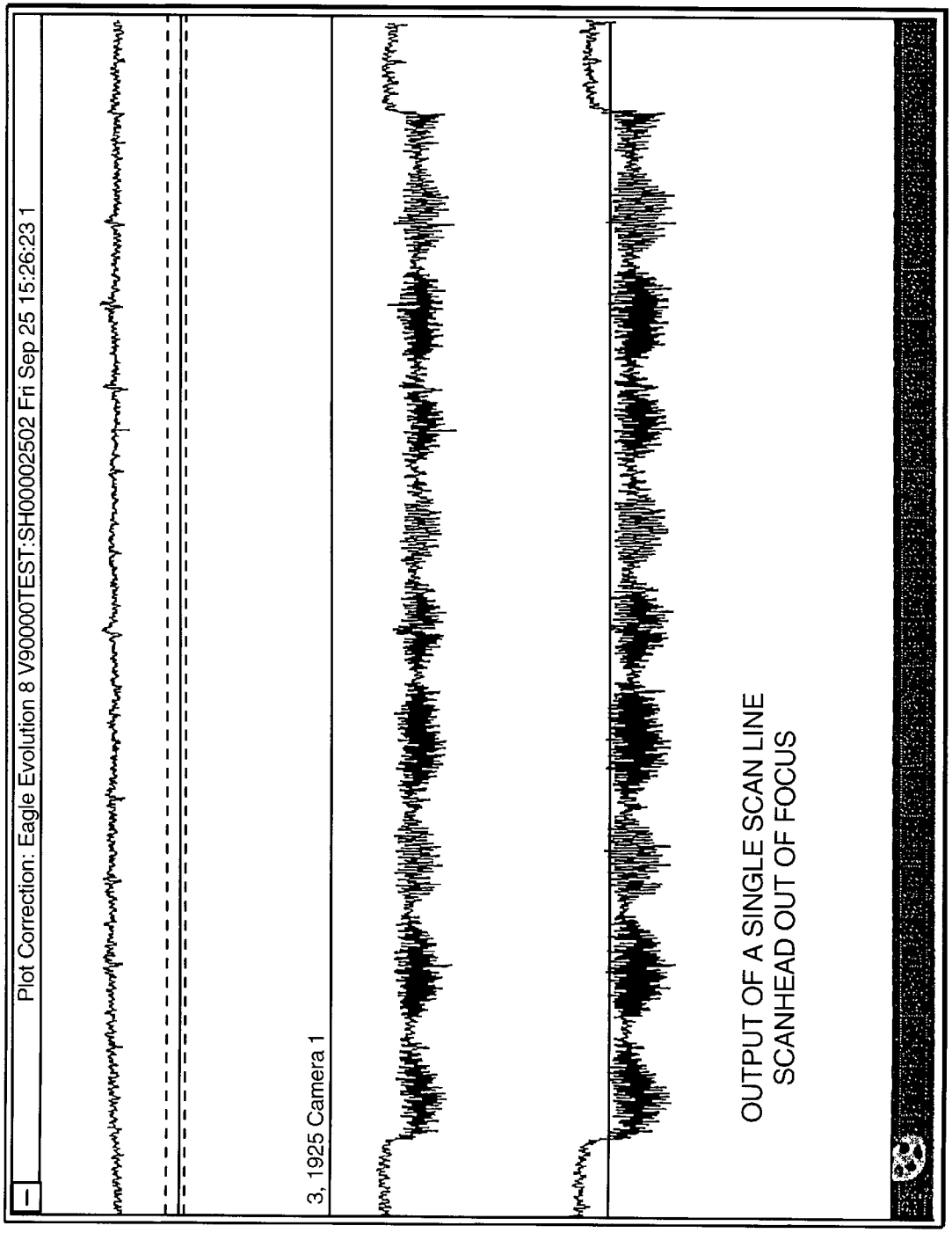
FIG. 10 depicts the output of the scanner when it is out of focus.

The scanner is then fully assembled and focused by scanning in a test pattern and adjusting the focal length between the medium being scanned and the lens/sensor arrangement. The scanned test pattern produces an output which may be displayed on a screen as shown in FIG. 10.

Although the focal length, which is the distance between the medium and the lens/sensors arrangement, is fixed along the length of each lens array there are small size anomalies in the flexible light pipes of the lens array that must be compensated for to obtained a focused scanned image. To compensate for these anomalies, the position of the precision made bar may be changed at various points along its length by altering the position of the adjustment screws of the scanhead body. By changing the position of the bar the focal length between the test pattern and the lens/sensor arrangement is also adjusted. First, the adjustment screws may be loosened by using a screwdriver. Adjustment may be accomplished by levering the precision-made bar with a head of a screwdriver and then tightening the screws to hold the precision-made bar in position. Individual adjustment screws may be raised or lowered to focus the lens/sensor arrangement at different positions along the length of the scanhead body. In the process of adjustment, the precision-made bar is deflected along its length by the adjustment screws. This deflection either increases or decreases the focal length depending on whether the precision made-bar is deflected upward or downward.

Figure 11:
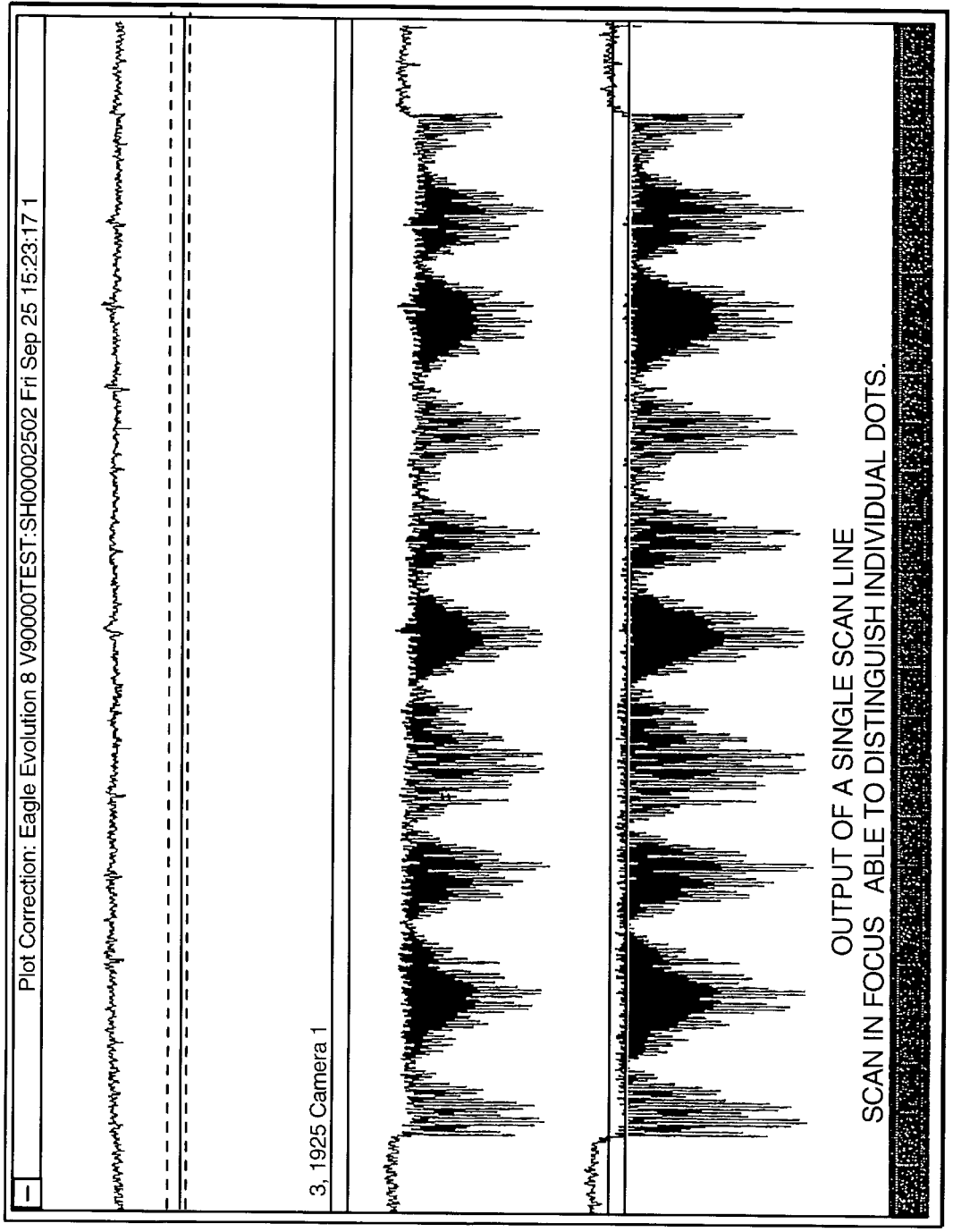
FIG. 11 depicts the output of the scanner when it is in focus.

Output from various sensors along the bar are displayed on a screen and instantaneous feedback to the adjustment of individual adjustment screws may be obtained by viewing the output of the scanned test image during adjustment. The test pattern output of FIG. 10 is out of focus as represented by the fact that the height of the black readings are not at a maximum. FIG. 11 shows the test pattern output after the scanner has been adjusted and is in focus. After the test pattern has been focused the precision made rigid bar may be securely mounted to the ends of the scanhead body.

Figure 12:
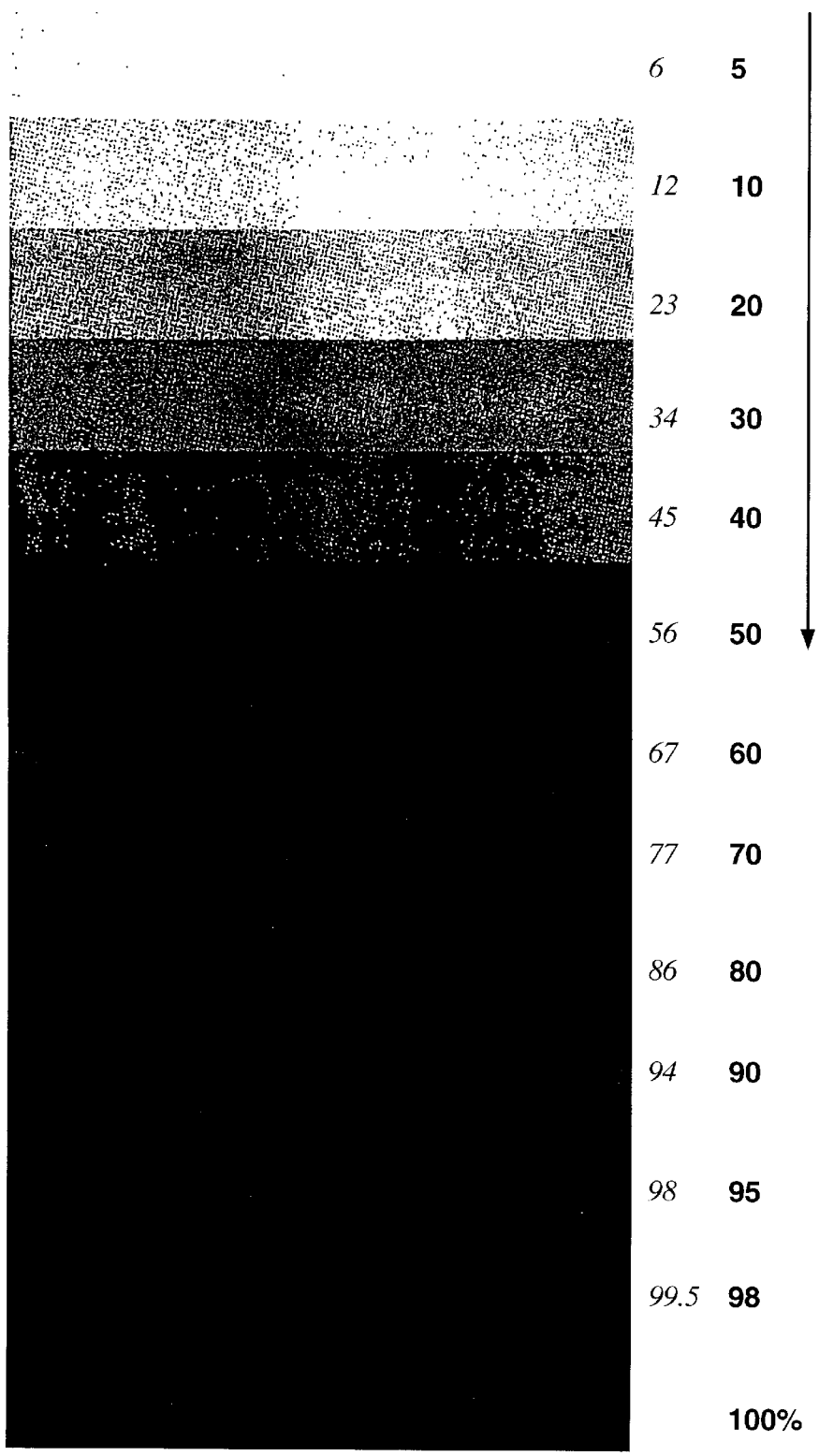
FIG. 12 shows the test pattern used for focusing.

The pattern which is scanned for focusing the scanner may be composed of black dots which are separated by white spaces as shown in FIG. 12. The black dots are approximately the size of a sensor and are equivalent to or smaller than the pixel resolution of the scanner. In one embodiment of the test pattern, it is necessary to distribute the black dots at intervals that are greater than and preferably much greater than the width of a sensor. By having the black dots spaced apart, some of the sensors will be fully aligned with the black dots, some sensors may be partially aligned with the black dots, and the remaining sensors will be aligned with the white space. As the scanned pattern is displayed, it will resemble FIG. 9 when it is out of focus. The sensors that are completely aligned with the black dots produce the greatest output, while the partially aligned sensors produce a medium output and the sensors aligned with the white space produce the lowest output. However, if the image is out of focus, the black dots that are completely aligned with the sensors are fuzzy, thereby permitting some of the surrounding white space to be read by the sensor. Upon alignment, the output of the sensors that are fully aligned with the black dots are at a peak. The black dots may be positioned in a pattern or randomly across the page. There must be a sufficient number of dots on the test pattern, so that multiple sensors across the width of the scanhead are completely aligned with the black dots to enable the scanner to be focused at the location of the adjustment screws.

Although the invention has been described with reference to several preferred embodiments, it will be understood by one of ordinary skill in the art that various modifications can be made without departing from the spirit and the scope of the invention, as set forth in the claims hereinbelow.

We claim:

1. A device for scanning an image on a medium having a width and providing signals representing the image, the device comprising:
    a frame,
    a transport, mounted to the frame, for moving the medium along a first axis transverse to the medium's width;
    a lamp illuminating the medium, the lamp having a first end and a second end wherein the first end and the second end are folded back approximately 180 degrees;
    a plurality of sensors proximate to the transport, wherein the plurality of sensors span the medium's width, the sensors providing a signal representative of a portion of the image within the illuminated portion of the medium; and
    a focal length adjustor, mounted to the frame between the sensors and the transport, for adjusting the distance between the medium and the sensors.

2. The device according to claim 1, further comprising:
    a substrate mounted to the frame so that the medium passes between the substrate and the transport, the substrate having a length spanning the width of the medium and the substrate connected to the plurality of sensors.

3. A method of manufacturing a device for scanning an image on a medium, wherein the device has sensors, lenses, a lamp and a transport, the method ensuring that the sensors, the lenses and the medium being scanned are all in proper alignment for focusing, the method comprising:
    mounting the sensors and lenses parallel to each other on a rigid bar having a length,
    inserting the rigid bar in an enclosure having a first end and a second end;
    mounting the enclosure adjacent the transport and the lamp;
    scanning a test pattern;
    displaying the output from the scan of the test pattern; and
    adjusting of the rigid bar within the enclosure so as to alter the distance between the rigid bar and the transport to focus the output.

4. The method according to claim 3, further comprising the step of loosely attaching the rigid bar to the first end and to the second end.

5. The method according to claim 4, wherein the enclosure has adjustable attachment points spaced along the length of the rigid bar and in the step of adjusting, each adjustable attachment point may be repositioned to adjust the distance between the rigid bar and the transport at a position along the length of the rigid bar.

6. The method occurring to claim 3, further comprising the step of:
    securely mounting the rigid bar to the enclosure.

7. The method according to claim 3, wherein the enclosure has a plurality of adjustment slots and corresponding locking devices spaced along the length of the rigid bar and in the step of adjusting, a locking device may be repositioned to adjust the distance between the rigid bar and the transport.

8. The method according to claim 7, wherein each locking device is a screw and each adjustment slot is configured to receive a screw therethrough.

9. A method of assembling a scanhead, a roller and a lamp which are part of a device for scanning an image on a medium, the method comprising the steps of:
    providing two end pieces which include connectors for receiving the ends of the scanhead and the roller, and holding the scanhead and the roller in parallel;
    attaching an assembly fixture to the two end pieces;
    providing a rigid box between the two end pieces;
    connecting the rigid box to the two end pieces;
    removing the assembly fixture; and
    mounting the scanhead, the roller and the lamp to the two end pieces.

* * * * *